Oct. 23, 1928.  1,688,812
L. C. HUFF
PRESSURE FEEDING APPARATUS
Original Filed Aug. 16, 1923
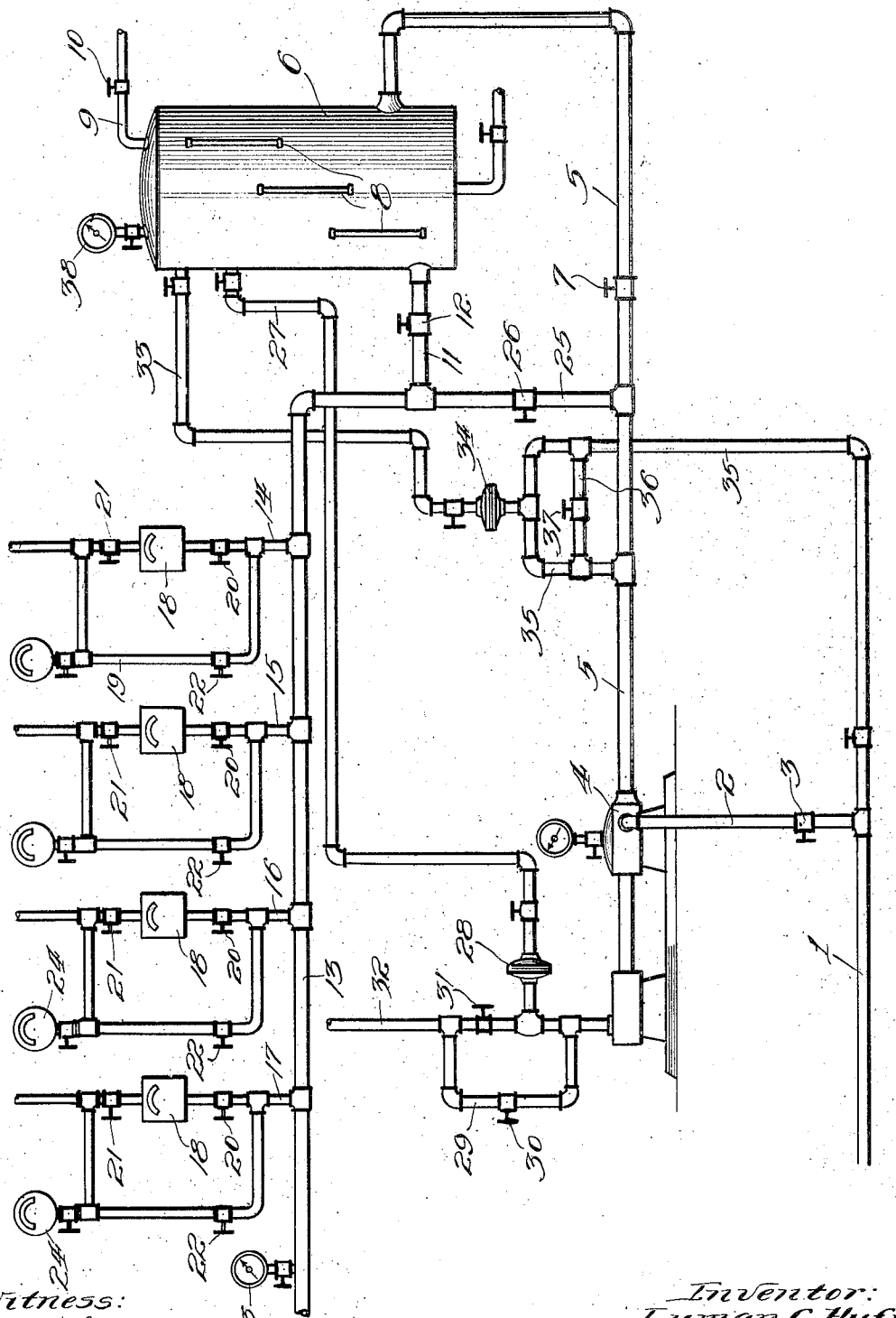

Patented Oct. 23, 1928.

1,688,812

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PRESSURE-FEEDING APPARATUS.

Application filed August 16, 1923, Serial No. 657,750. Renewed May 28, 1928.

This invention relates to improvements in a pressure feeding apparatus and refers more particularly to a device in which a fluid substance is fed to a plurality of separate units of an apparatus maintained under a common pressure.

Among the salient objects of the invention are to provide an apparatus whereby a fluid substance may be charged continuously under a relatively constant pressure to separate units having the same amount of material charged to each unit, and a constant pressure upon the supply pipe; to provide an apparatus whereby a uniform feed is made possible by automatically controlling the speed of the supply pump, secondly, by means of a relief valve actuated when excess pressure is built-up on a supply drum, and third, by maintaining an air or gas cushion adapted to absorb the pump pulsations and variations.

The single figure is a diagrammatic view of the apparatus layout, showing the means of connecting the different lines to produce the desired effect. The charging system will be explained in connection with supplying oil to a pressure system for the purpose of destructive distillation or cracking, but it is understood that the apparatus is adapted to use in any type of system wherein a liquid or fluid material is introduced simultaneously to a plurality of units which are maintained under a common pressure.

Referring to the drawing, the oil to be treated is introduced from any convenient source through the oil supply line 1, and is directed through a pipe 2 controlled by a valve 3 to the suction side of the pump 4. The discharge side of the pump charges the oil through a line 5 to a receiver or charging chamber 6. A valve 7 is interposed in the line 5.

The oil is charged to the chamber 6 and is there maintained at a level which may be ascertained by means of the liquid level gauges 8. Above the oil is maintained a gas or air space into which is charged incondensable gas or air to a predetermined pressure, according to the pressure which is maintained in the pressure units to which the oil is to be charged. This gas or air is injected into the chamber through a line 9 controlled by a valve 10. If desired, the incondensable gas from the receiving tank, not shown, may be used. The oil from the charging chamber is directed through a pipe 11 controlled by a valve 12, and passes thence into the pressure header 13 into which are connected a plurality of charging lines 14, 15, 16 and 17 which communicate with the separate units to which the oil is to be charged. Meters 18 are interposed in the separate charging lines, and each charging line is also equipped with a by-pass line 19 controlled by valves 20 and 21 in the charging line, and valve 22 in the by-pass line. A pressure gauge 23 is connected into the header for registering the pressure therein. Also pressure gauges 24 are connected into the by-pass lines for similar purposes. The line 11 connecting with the pressure header has interposed therein a T connection, one outlet of which is connected by a by-pass line 25 controlled by a valve 26 to the charging line 5, the latter being connected to the discharge side of the pump 4. Thus, if for any reason it is desired to cut out the charging chamber, the oil may be by-passed directly to the header 13 from the line 5 through by-pass 25. This control is effected by manipulation of valves 7, 12 and 26. To that portion of the charging chamber which contains the gas or air cushion is connected a pipe 27 by means of which the pressure in the chamber is transmitted to a steam governor or control valve 28 actuated by the pressure in the receiver. The function of this control valve is to regulate the steam supply to the pump, and thereby control the speed of the pump and the amount of charging stock supplied to the charging chamber. A by-pass 29 controlled by valves 30 and 31 is connected around the steam supply line 32. In a like manner a pressure line 33 communicating with the vapor space of the charging chamber, has interposed therein a pressure relief valve 34 actuated when a predetermined pressure has built-up in the receiver to open the by-pass line 35 causing a portion of the charging stock forced through the line 5 to be recycled through the by-pass line 35 and introduced to the line 2 or the suction side of the pump 4. The by-pass line 35 is also equipped with a secondary by-pass line 36, the latter being controlled by valve 37. Normally valves 34 and 37 are closed, valve 34 being opened only when an excess pressure is developed in the chamber 6, the valve 37 being manually operable.

The operation of the apparatus is as follows: The oil introduced and charged by the pump 4 to the charging chamber is there maintained in a considerable body under pressure, which is imposed by an air or gas cushion above the oil. From this, the oil body is continuously supplied charging stock to the separate units, not shown, connected to the pressure header 13 by secondary connecting lines 14, 15, 16 and 17. The presence of the oil body in the charging chamber assures at all times adequate liquid, and serves to absorb any pump pulsations or variations which commonly result from uneven operation of the charging pump.

A pressure line 27 connects the chamber 6 with the steam control valve 28 which regulates the speed of the charging pump in accordance with the pressure in the charging chamber. Thus, if the level of the liquid in the charging chamber rises, the pressure on the gaseous material above the liquid will rise, registered by the pressure gauge 38. This excess pressure in the charging chamber will operate the steam control valve 28 and decrease the speed of the pump, thus permitting less charging stock to enter the charging chamber. This excess pressure on the gaseous material in the charging chamber is also transmitted through the line 33, and operates the pressure relief valve 34 causing a portion of the charging stock to be bypassed from the discharge line 5 of the pump back to the suction side of the pump through the by-pass line 35.

By means of the apparatus, a smooth constant flow of liquid is introduced to the separate units, and a more uniform operation which tends to produce more efficient and satisfactory results in the production of materials in the separate units, is effected.

I claim as my invention:

1. In a fluid charging apparatus for pressure systems, the combination with a pump interposed in a supply line, of a liquid reservoir connected thereto receiving the fluid pumped through the supply line, a drawoff from said reservoir communicating with separate units to be supplied with liquid, means for introducing an extraneous gas under pressure to the reservoir above the body of liquid maintained therein, to maintain the liquid in the reservoir under a predetermined pressure sufficient to supply liquid to said units, against the pressure maintained therein, and means communicating with the reservoir for automatically varying the speed of the pump operated by variations in the pressure in the reservoir, and an auxiliary line communicating with the reservoir operated by variations in the pressure therein to by-pass the excess liquid from the discharge side of side pump back to the suction side thereof.

2. A method of supplying liquid at a uniform rate of flow to a plurality of units, each maintained under a predetermined pressure, consisting in charging the liquid under pump pressure to an enlarged zone, in maintaining a substantial body of liquid in the enlarged zone under a predetermined pressure imposed by the introduction of an extraneous gas to said chamber, in continuously supplying liquid from said body to said separate units against the pressure maintained in said units, and in automatically maintaining the volume of liquid in said chamber and pressure maintained on the body of liquid therein substantially constant by simultaneously controlling the speed of operation of the pump and by-passing a portion of the liquid discharged from the pump back to the suction side thereof.

3. A method of supplying liquid at a uniform rate of flow to a plurality of units, each maintained under a predetermined pressure, consisting in charging the liquid under pump pressure to an enlarged zone, in maintaining a substantial body of liquid in the enlarged zone under a predetermined pressure, in continuously supplying liquid from said body to said separate units against the pressure maintained in said units, and in automatically maintaining the volume of liquid in said chamber and pressure maintained on the body of liquid therein substantially constant by controlling the speed of operation of the pump and by-passing a portion of the liquid discharged from the pump back to the suction side thereon.

LYMAN C. HUFF.